(12) United States Patent
Yasuda et al.

(10) Patent No.: US 8,730,386 B2
(45) Date of Patent: May 20, 2014

(54) IMAGING APPARATUS INCLUDING METAL MAIN FRAME AS ASSEMBLY BASIS

(75) Inventors: Koji Yasuda, Osaka (JP); Masanao Wakikawa, Osaka (JP); Tsuneyo Metabi, Osaka (JP)

(73) Assignee: Panasonic Corporation, Osaka (JP)

( * ) Notice: Subject to any disclaimer, the term of this patent is extended or adjusted under 35 U.S.C. 154(b) by 252 days.

(21) Appl. No.: 13/063,276

(22) PCT Filed: Sep. 9, 2009

(86) PCT No.: PCT/JP2009/004461
§ 371 (c)(1),
(2), (4) Date: Mar. 10, 2011

(87) PCT Pub. No.: WO2010/029731
PCT Pub. Date: Mar. 18, 2010

(65) Prior Publication Data
US 2011/0164171 A1 Jul. 7, 2011

(30) Foreign Application Priority Data

Sep. 11, 2008 (JP) ................................. 2008-233635

(51) Int. Cl.
*H04N 5/225* (2006.01)
(52) U.S. Cl.
USPC .......................................... 348/373; 396/529
(58) Field of Classification Search
CPC ........ G03B 17/00; G03B 17/12; G03B 17/14; G03B 2217/00; H04N 5/2251; H04N 5/2252; H04N 5/2253; H04N 5/2254; H04N 5/2257

USPC ........................... 348/373; 396/529, 530, 535
See application file for complete search history.

(56) References Cited

U.S. PATENT DOCUMENTS

| 4,769,711 | A | 9/1988 | Date |
| 5,122,880 | A | 6/1992 | Nagano |
| 5,274,413 | A | 12/1993 | Nomura et al. |
| 5,412,425 | A | 5/1995 | Nagano |
| 5,561,462 | A | 10/1996 | Nagano |
| 5,828,919 | A | 10/1998 | Furuya et al. |
| 7,119,967 | B2 * | 10/2006 | Kiga et al. .................... 359/694 |

(Continued)

FOREIGN PATENT DOCUMENTS

| EP | 1 526 716 | 4/2005 |
| JP | 61-202590 | 9/1986 |

(Continued)

OTHER PUBLICATIONS

Machine English Translation JP2008116617A (May 22, 2008).*

(Continued)

*Primary Examiner* — Nelson D. Hernández Hernández
(74) *Attorney, Agent, or Firm* — Panasonic Patent Center

(57) ABSTRACT

The imaging apparatus includes a lens mount to which a lens unit is mountable, an imaging unit operable to generate an image signal, and a shutter unit that is arranged between the lens mount and the imaging unit, and is capable of limiting the light incident on the imaging unit, opening and closing at least at recording and being kept in an opened state during a recording preparation operation, and a main frame to which the lens mount, the shutter unit and the imaging unit are fixed.

3 Claims, 13 Drawing Sheets

(56) References Cited

U.S. PATENT DOCUMENTS

| | | | |
|---|---|---|---|
| 2004/0252991 | A1* | 12/2004 | Kawai et al. .................. 396/529 |
| 2005/0025475 | A1 | 2/2005 | Kurosawa |
| 2005/0030419 | A1 | 2/2005 | Kikuchi |
| 2005/0162538 | A1 | 7/2005 | Kurosawa |
| 2006/0056840 | A1* | 3/2006 | Usuda et al. .................. 396/492 |
| 2007/0053683 | A1 | 3/2007 | Fujikawa |
| 2007/0104480 | A1 | 5/2007 | Shiozaki et al. |
| 2007/0147193 | A1 | 6/2007 | Wada et al. |
| 2007/0292123 | A1 | 12/2007 | Ueda et al. |
| 2008/0079812 | A1 | 4/2008 | Yamamoto |
| 2008/0259200 | A1 | 10/2008 | Matsumoto |
| 2010/0060771 | A1 | 3/2010 | Shintani |
| 2010/0060775 | A1 | 3/2010 | Shintani |
| 2010/0061716 | A1 | 3/2010 | Iyoda et al. |
| 2010/0061717 | A1 | 3/2010 | Iyoda et al. |
| 2010/0073507 | A1 | 3/2010 | Honjo et al. |
| 2010/0073551 | A1 | 3/2010 | Honjo et al. |
| 2010/0111517 | A1 | 5/2010 | Yasuda |
| 2010/0171876 | A1 | 7/2010 | Kikuchi |

FOREIGN PATENT DOCUMENTS

| | | |
|---|---|---|
| JP | 62-34885 | 2/1987 |
| JP | 1-222580 | 9/1989 |
| JP | 2-312451 | 12/1990 |
| JP | 3-94582 | 4/1991 |
| JP | 10-3118 | 1/1998 |
| JP | 2942294 | 6/1999 |
| JP | 2000-298307 | 10/2000 |
| JP | 2002-341423 | 11/2002 |
| JP | 2003-15191 | 1/2003 |
| JP | 2005-49616 | 2/2005 |
| JP | 2005-57656 | 3/2005 |
| JP | 2005-215015 | 8/2005 |
| JP | 2005-250006 | 9/2005 |
| JP | 2006-148299 | 6/2006 |
| JP | 2007-72304 | 3/2007 |
| JP | 2007-127836 | 5/2007 |
| JP | 2008-28998 | 2/2008 |
| JP | 2008-92283 | 4/2008 |
| JP | 2008-92306 | 4/2008 |
| JP | 2008-113377 | 5/2008 |
| JP | 2008-116617 | 5/2008 |
| JP | 2008-170883 | 7/2008 |
| JP | 2008-203554 | 9/2008 |
| JP | 2008-205619 | 9/2008 |
| JP | 2009-175595 | 8/2009 |
| JP | 2009-198629 | 9/2009 |
| JP | 2010-21963 | 1/2010 |
| JP | 2010-41121 | 2/2010 |
| JP | 2010-44203 | 2/2010 |
| JP | 2010-60976 | 3/2010 |
| JP | 2003-344898 | 12/2013 |

OTHER PUBLICATIONS

Notification of Reasons for Refusal issued in the corresponding JP Patent Application No. 2010-528634, dated Apr. 26, 2011.

International Search Report of PCT Application No. PCT/JP2009/004461, dated Dec. 15, 2009.

English translation of previously filed Japanese Office Action ("Notification of Reason(s) for Refusal") dated Jan. 4, 2011 issued in Japanese Application No. 2010-528634.

English translation of previously filed Japanese Office Action ("Notification of Reason(s) for Refusal") dated Mar. 1, 2011 issued in Japanese Application No. 2010-528634.

The Extended European Search Report of EP Application No. 09 81 2880 dated Jul. 26, 2011.

* cited by examiner

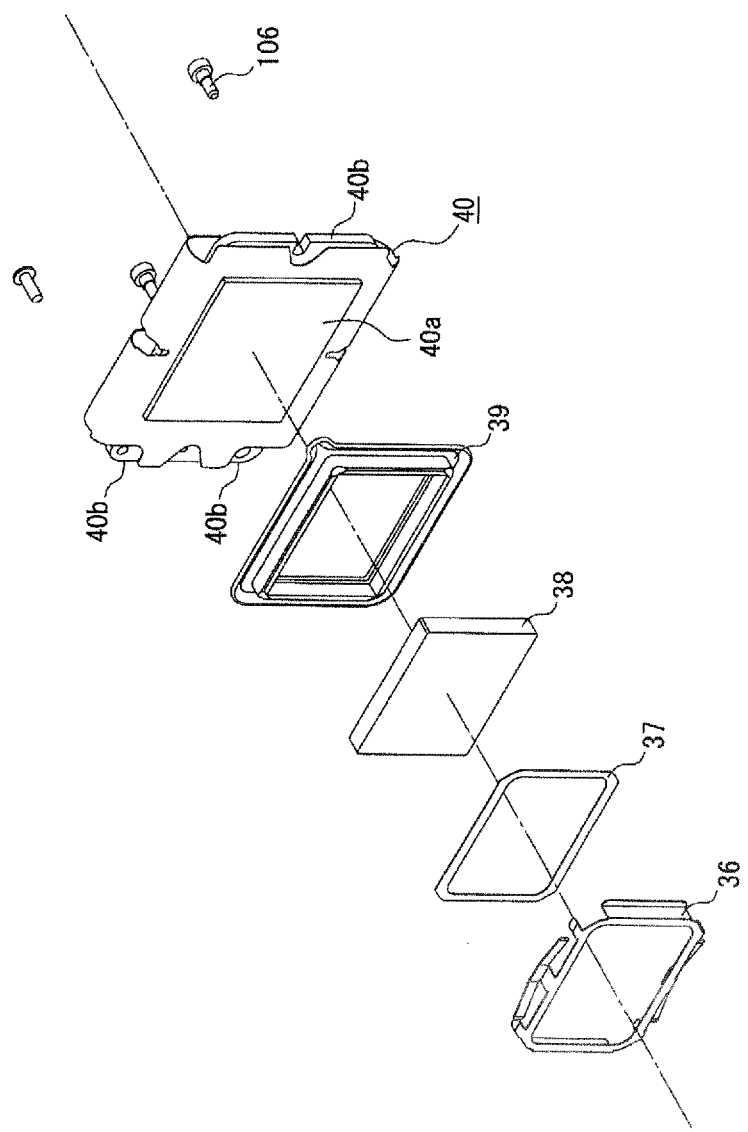

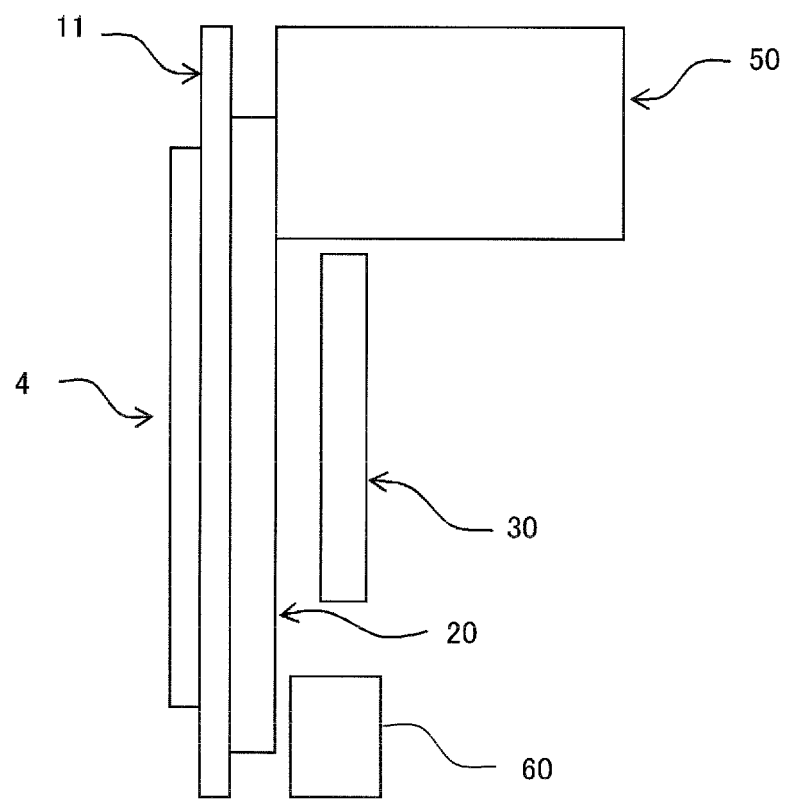

IMAGING APPARATUS INCLUDING METAL MAIN FRAME AS ASSEMBLY BASIS

TECHNICAL FIELD

The present invention relates to a single-lens type imaging apparatus.

BACKGROUND ART

In recent years, single-lens reflex digital cameras capable of recording an image of higher image quality than compact digital cameras have been widespread.

Patent document 1 discloses configuration of such single-lens reflex digital camera. In a body of the single-lens reflex camera disclosed in the Patent document 1, a lens mount, a mirror box, a shutter device and an imaging sensor are arranged along an optical axis in this order. The mirror box has a movable mirror for guiding light incident through a lens to a prism and an optical finder while photographing is not performed. When the user presses a release button, the movable mirror rotates and withdraws from the optical axis and the light incident through the lens enters the imaging sensor. The imaging sensor converts the incident light into an electrical signal and outputs the electrical signal. The outputted electrical signal is sent to a signal processing circuit to generate an image signal.

PRIOR DOCUMENT

Patent Document

Patent document 1: JP-A2007-72304

Further, a so-called live view function is required in the single-lens type digital cameras similarly to compact cameras.

To satisfy the requirement, an object of the present invention is to provide a single-lens type imaging apparatus capable of achieving the live view function.

DISCLOSURE OF INVENTION

The live view function is a function of receiving light incident on an imaging sensor through a lens and displaying an image on a liquid crystal display even when the image is not taken. By achieving the live view function in such single-lens reflex digital camera having the mirror box, the optical finder can be omitted, and by omitting the optical finder, the mirror box for guiding the light incident through the lens to the optical finder can be also omitted. This enables size reduction of the imaging apparatus.

However, when the mirror box is omitted, the rigidity of a camera body lowers, causing a problem how the strength to support the lens and the shutter device is ensured.

An imaging apparatus according to the present invention addresses this problem. That is, the imaging apparatus according to the present invention includes a mount unit to which a lens unit is mountable, an imaging unit operable to generate an image signal, and a normally-open type shutter unit that is arranged between the mount unit and the imaging unit, and is capable of limiting light incident on the imaging unit, wherein the mount unit has a frame to which the shutter unit and the imaging unit are fixed.

According to the present invention, by adopting a normally-open type shutter unit as a shutter unit, live view can be achieved. Further, since a mirror box is not provided, thickness of a camera body in an optical axis direction can be reduced, thereby enabling miniaturization of the imaging apparatus. Moreover, since a mount unit has a frame to which the shutter unit and an imaging unit are fixed, the strength to support a lens and the shutter unit can be ensured in the imaging apparatus even if the mirror box is omitted.

BRIEF DESCRIPTION OF DRAWINGS

FIG. 3C is an exploded perspective view of a shutter unit, an imaging unit, a radiator blade and the like.

FIG. 4C is an enlarged perspective view of a part of exploded imaging unit.

FIG. 9 is a simplified version of FIG. 7.

BEST MODE FOR CARRYING OUT THE INVENTION

Embodiment

1. Configuration of Imaging Apparatus

Figure 1:
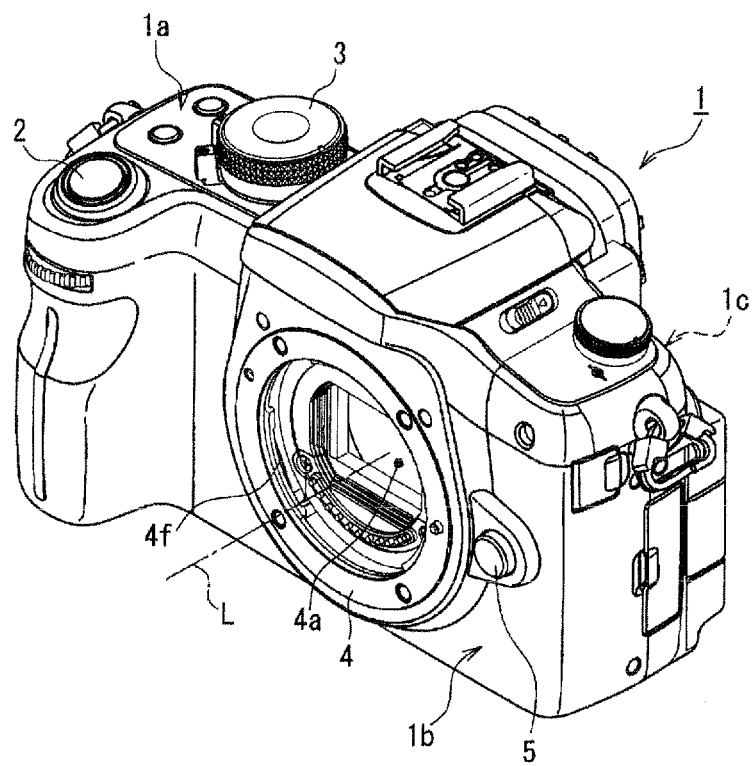
FIG. 1 is a perspective view showing appearance of an interchangeable lens type imaging apparatus in accordance with an embodiment.
Figure 2:
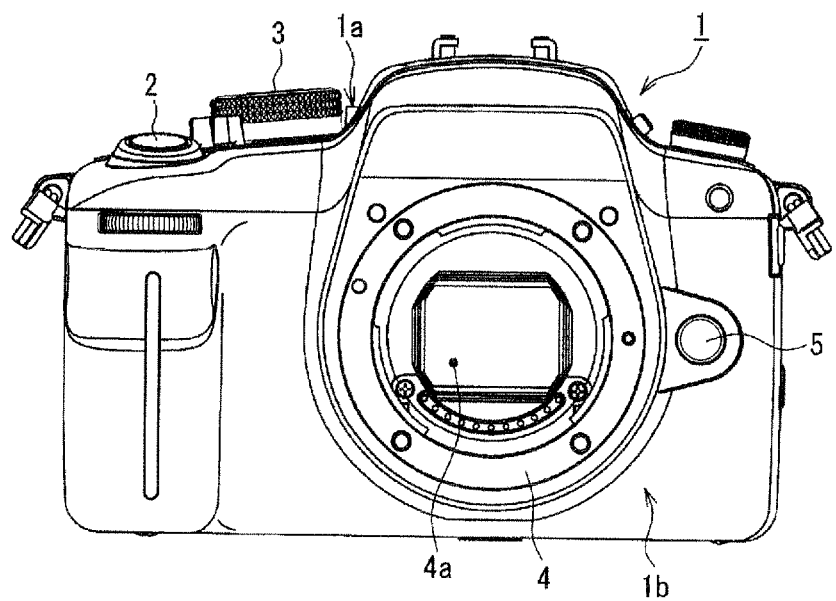
FIG. 2 is a front view showing appearance of the interchangeable lens type imaging apparatus in accordance with the embodiment.

FIG. 1 is a perspective view showing appearance of a single-lens camera body as an example of an imaging apparatus in accordance with this embodiment. FIG. 2 is a front view of the camera body in FIG. 1.

As shown in FIG. 1 and FIG. 2, a release button 2, a mode dial 3 and the like are arranged on an upper surface 1a of the camera body 1. An image of a subject can be captured by pressing the release button 2. In the imaging apparatus having an autofocus function, it is possible to bring the subject into focus by performing a half-press operation of the release button 2. Various recording modes can be selected by rotating the mode dial 3.

A lens mount 4, a lock release button 5 and the like are arranged on a front surface 1b (a surface that is substantially perpendicular to the upper surface 1a and faces the subject when capturing an image of the subject) of the camera body 1. The lens mount 4 includes a substantially circular opening 4a and an engaged part 4f, to which a lens unit (not shown) can be mounted, formed on the periphery of the opening 4a. By engaging a convex engaging part (not shown) formed on the lens unit into the concave engaged part 4f (described later), the lens unit can be attached to the lens mount 4 of the camera body 1.

A liquid crystal display monitor (not shown) capable of displaying an image captured by the imaging sensor (described later) and the like, and various operating units such as a cursor button for operation of a menu screen are arranged on a back surface 1c on the reverse side to the front surface 1b.

The camera body 1 in this embodiment does not include the mirror box that is indispensable for the conventional single-lens reflex cameras. Accordingly, when a shutter unit (described later) is opened, the imaging sensor arranged in the back of the opening 4a can be viewed from the side of the lens mount 4. The shutter unit is arranged in front of the imaging sensor when viewed from the side of the lens mount 4. A normally-open type shutter unit that opens/closes at recording operation and keeps its opened state during a recording preparation operation is employed as the shutter unit. Examples of the recording preparation operation include an operation of the imaging apparatus to provide the live view function for the user's observation of the subject. The live view function is a function of receiving light incident on the imaging sensor through the lens and displaying an image on the liquid crystal display, even though an image is not being recorded. While the live view function is performed, the shutter needs to be kept in the opened state. In case of employing a normally close type shutter which is closed when power is not supplied to it during non-conduction, it needs to keep the shutter in the opened state at all times during performance of the live view function, which requires electric power for this purpose. The normally-open type shutter used in this embodiment is generally kept in the opened state when supplied with no power during non-conduction. Therefore, by employing the normally-open type shutter, electric power used for opening of the shutter becomes unnecessary, thereby saving power consumption during performance of the live view function. Since the camera body 1 in this embodiment includes no optical finder, the camera body 1 is configured so that the composition can be decided by displaying the image captured by the imaging sensor on the liquid crystal display monitor or the like.

2. Configuration of Imaging System

The imaging apparatus shown in FIG. 1 and FIG. 2 has an imaging system therein. The imaging system is mainly composed of a mount unit, a shutter unit and an imaging unit. Configuration of the imaging system will be described below.

Figure 3A:
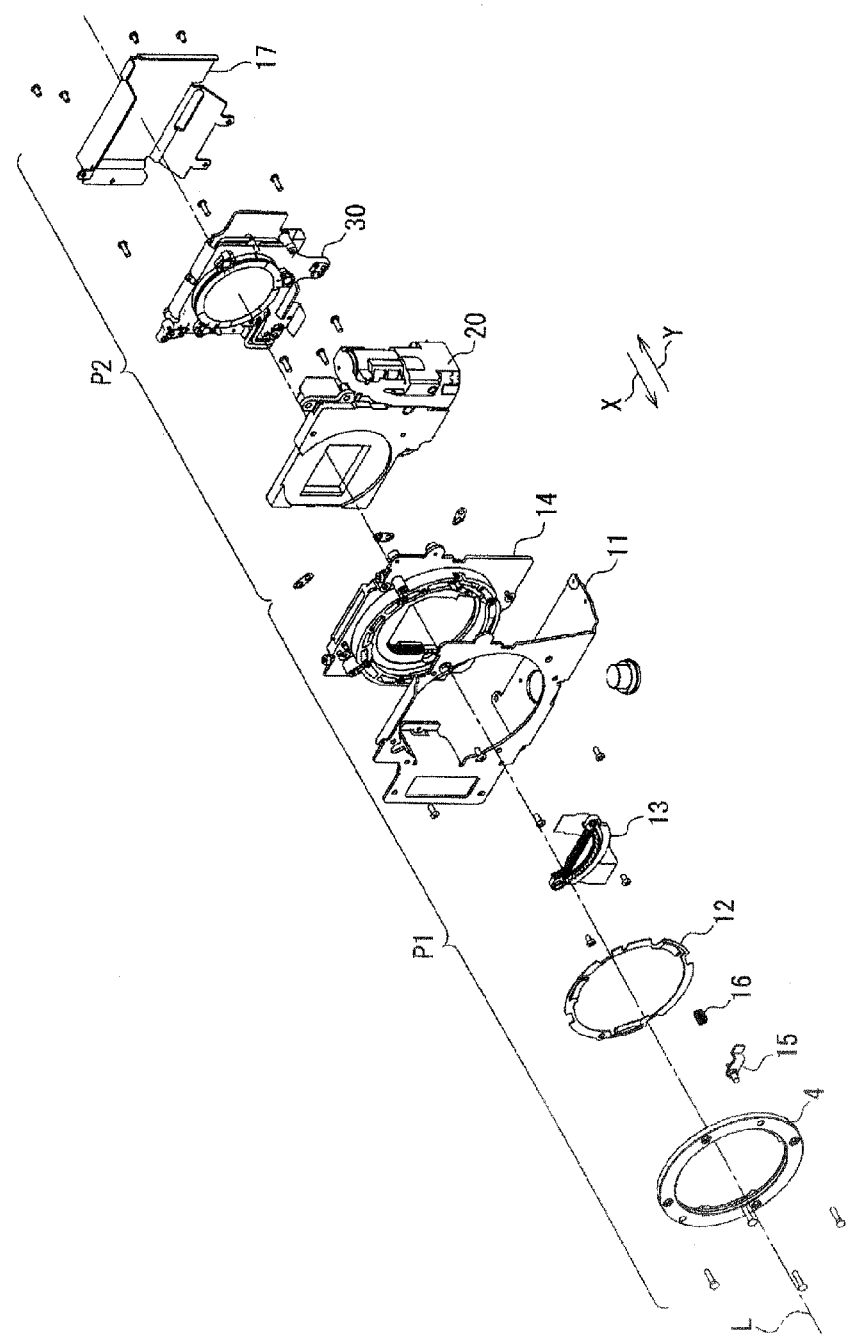
FIG. 3A is an exploded perspective view of an imaging system.
Figure 3B:
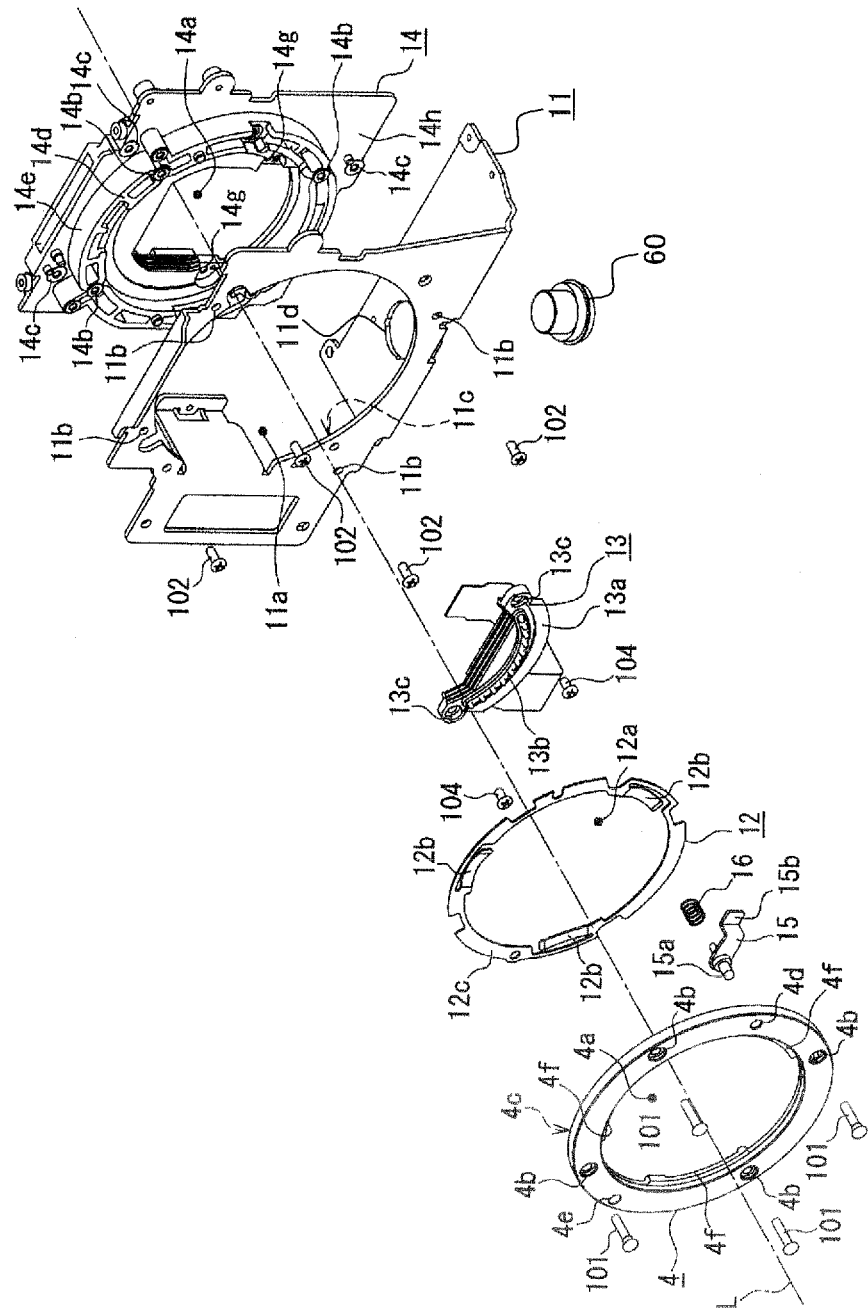
FIG. 3B is an exploded perspective view of a mount unit.
Figure 3C:
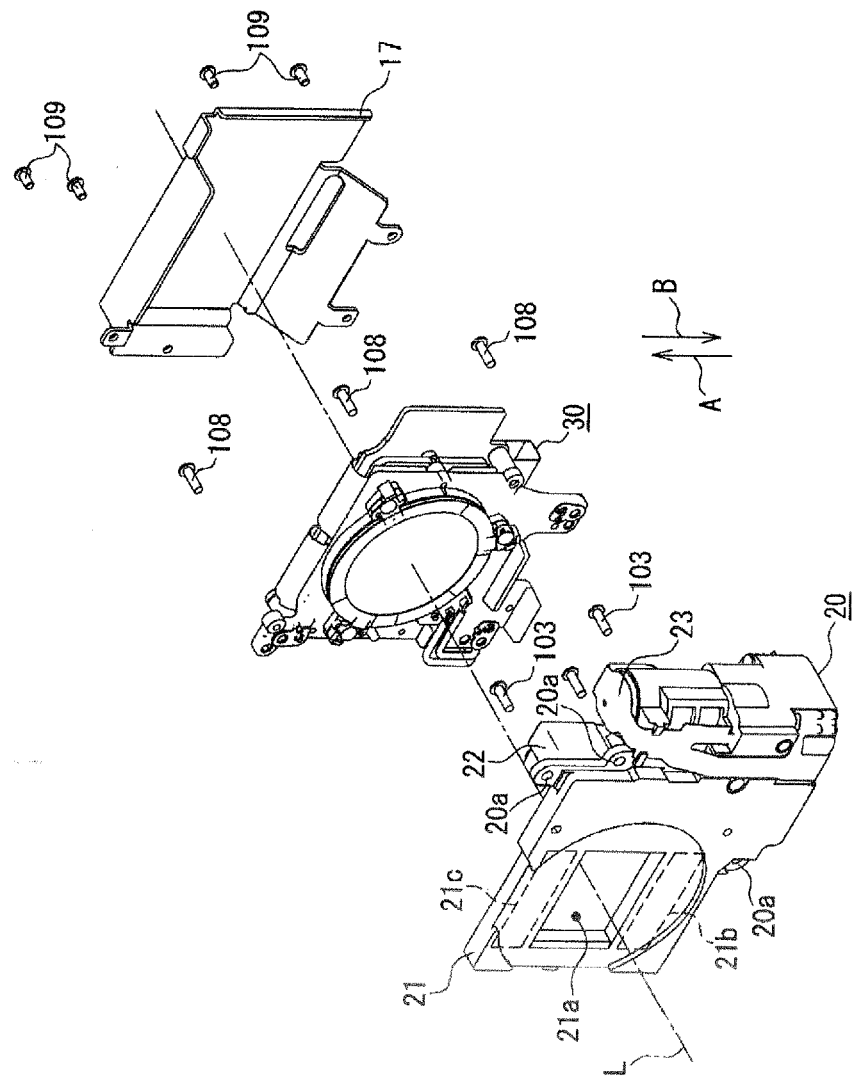

FIG. 3A is an exploded perspective view of the imaging system. FIG. 3B is an enlarged perspective view of a parts group P1 in FIG. 3A. FIG. 3C is an enlarged perspective view of a parts group P2 in FIG. 3A. The parts group P1 is a parts group composing the mount unit. The parts group P2 includes a shutter unit 20, an imaging unit 30 and a heatsink 17.

As shown in FIG. 3A, in the imaging system, the lens mount 4, a lens mount spring 12, a contact pin unit 13, a main frame 11, a mount frame 14, the shutter unit 20, the imaging unit 30 and the heatsink 17 are arranged in this order from the side of the front surface 1b (refer to FIG. 1, for example) in a direction of an optical axis L along the optical axis L. This arrangement order of these parts is merely an example. In this description in this embodiment, in the parts included in the imaging system, the surface oriented in a direction represented by an arrow X is defined as a "front surface" and the surface oriented in a direction represented by an arrow Y is defined as a "back surface". Configuration of each part will be described below.

As shown in FIG. 3B, the main frame 11 is made of metal such as stainless steel and an opening 11a for guiding light to the imaging sensor is formed substantially at the center of the main frame 11. Holes 11b into which a plurality of (four in this embodiment) screws 102 can be inserted are also formed on the periphery of the opening 11a of the main frame 11.

The lens mount 4 is made of metal such as stainless steel and the opening 4a for guiding light to the imaging sensor is formed substantially at the center of the lens mount 4. A plurality of (four in this embodiment) holes 4b into which screws 101 can be inserted are also formed on the lens mount 4. A hole 4d into which a protrusion 15a of a lens lock pin 15 (described later) is introduced is formed on the lens mount 4. A mark 4e used to align the position of the lens unit and the lens mount 4 (relative position in the direction of rotation about the optical axis L) at the time when the user attaches the lens unit to the camera body 1 is also formed on the lens mount 4.

An opening 12a for guiding light to the imaging sensor is formed substantially at the center of the lens mount spring 12. A plurality of (three in this embodiment) spring portions 12b are formed in the vicinity of an outer circumference of the lens mount spring 12. The spring portions 12b can be elastically deformed in the direction of the optical axis L. A front surface 12c of the lens mount spring 12 is in contact with a back surface 4c of the lens mount 4. A small cavity exists between the spring portions 12b and a front surface 14d of the mount frame 14. The spring portions 12b are in contact with the engaging part of the lens unit attached to the camera body 1 while being elastically deformed. This can reduce unsteadiness between the camera body 1 and the lens unit.

The contact pin unit 13 includes a frame 13a made of resin and a plurality of (11 in this embodiment) contact pins 13b. The contact pins 13b are arranged so as to protrude from the front surface of the frame 13a toward the lens mount 4 in the direction of the optical axis L. When the lens unit is attached to the lens mount 4, the contact pins 13b are mechanically and electrically coupled to connectors provided in the lens unit. Thereby, a camera microcomputer arranged in the camera body 1 and a lens microcomputer arranged in the lens unit can communicate each other. A plurality of (two in this embodiment) holes 13c into which screws 104 can be introduced are also formed on the contact pin unit 13.

The mount frame 14 is made of resin. An opening 14a for guiding light to the imaging sensor is formed substantially at the center of the mount frame 14. A substantially cylindrical protrusion 14e is formed around the opening 14a on the mount frame 14. A plurality of (four in this embodiment) screw holes 14b into which the screws 101 can be screwed are formed on the front surface 14d of the protrusion 14e. The protrusion 14e has an outer diameter so as to be inserted into the opening 11a on the main frame 11. A plurality of (four in this embodiment) screw holes 14c are formed around the protrusion 14e on the mount frame 14. A plurality of (two in this embodiment) screw holes 14g are also formed in the vicinity of the opening 14a on the mount frame 14. The screws 104 are screwed into the screw holes 14g.

The lens lock pin 15 has the protrusion 15a at one end and has a pressed part 15b at the other end. The protrusion 15a is inserted into the hole 4d formed on the lens mount 4. When the lens unit is attached to a normal position of the lens mount 4, the protrusion 15a can be engaged with a concave part (not shown) formed on the lens unit. By engaging the protrusion 15a into the concave part formed on the lens unit, when the lens unit is attached to the lens mount 4, the position in the rotation direction about the optical axis L can be decided. The pressed part 15b is arranged in the back of the lock release button 5 placed on the front surface 1b of the camera body 1, and when the user presses the front surface of the lock release button 5, the pressed part 15b is pressed by the lock release button 5 in the direction represented by the arrow Y in FIG. 3A. A lock pin spring 16 is arranged on the surface opposite to the surface where the protrusion 15a of the lens lock pin 15 is arranged. This lock pin spring 16 urges the lens lock pin 15 in the direction represented by the arrow X in FIG. 3A at all times. By pressing the lock release button 5, the lens lock pin 15 displaces in the direction represented by the arrow Y in FIG. 3A against the urging force of the lock pin spring 16. When the release button 5 is pressed in the direction represented by the arrow Y in FIG. 3A, the protrusion 15a is detached from the concave part formed on the lens unit, resulting in that the lens unit can be rotated about the optical axis L, thereby removing the lens unit from the lens mount 4.

As shown in FIG. 3C, the shutter unit 20 includes a shutter mechanism 21, a shutter control unit 22 and a motor 23. A substantially rectangular opening 21a for guiding light incident from the outside to the imaging sensor (described later) in the imaging unit 30 is formed on the shutter mechanism 21. The shutter mechanism 21 includes a plate-like front curtain 21b and rear curtain 21c that can shield light passing through the opening 21a. For convenience of explanation, FIG. 3C shows the state where the front curtain 21b is stored in a storage unit below the opening 21a, and the rear curtain 21c is stored in a storage unit above the opening 21a. The front curtain 21b and the rear curtain 21c are arranged so as to be movable in directions represented by arrows A and B. The shutter control unit 22 has a plunger mechanism therein and can hold the front curtain 21b and the rear curtain 21c in a withdrawn state (the state as shown in FIG. 3C, in which the front curtain 21b is stored in the storage unit below the opening 21a and the rear curtain 21c is stored in the storage unit above the opening 21a, and these curtains are withdrawn from the opening 21a). The shutter control unit 22 also has a driving mechanism for moving the front curtain 21b and the rear curtain 21c. The motor 23 feeds a driving force of moving the front curtain 21b and the rear curtain 21c into the storage unit above the opening 21a to the shutter control unit 22. A plurality of (three in this embodiment) holes 20a into which screws 103 can be inserted are formed on the shutter unit 20.

Here, basic operations of the shutter unit 20 will be described. In the state where light enters on the imaging sensor through the lens unit and an image is displayed on the liquid crystal display monitor (so-called monitor state), the front curtain 21b is stored in the storage unit below the opening 21a by the shutter control unit 22 and the rear curtain 21c is charged at the position stored in the storage unit above the opening 21a by the shutter control unit 22 (withdrawn state).

Then, when the release button 2 (refer to FIG. 1, for example) is pressed, the front curtain 21b moves in the direction represented by the arrow A by the driving force fed from the motor 23 and shields light passing through the opening 21a. Next, charging of the front curtain 21b and the rear curtain 21c is released in phased manner by the shutter control unit 22. Specifically, first, the front curtain 21b moves from the position where the front curtain 21b shields light passing through the opening 21a in the direction represented by the arrow B, and after a lapse of a predetermined time, the rear curtain 21c moves from the storage unit above the opening 21a in the direction represented by the arrow B. As a result, the front curtain 21b is stored in the storage unit below the opening 21a and the rear curtain 21c shields light passing through the opening 21a. At this time, an image signal is generated based on light incident on the imaging sensor 40 (described later) during the time when the front curtain 21b is withdrawn from the opening 21a and the time when the rear curtain 21c shields light passing through the opening 21a. The image signal generated at this time becomes an image signal obtained according to a user's release operation.

After that, the rear curtain 21c moves in the direction represented by the arrow A by the driving force fed from the motor 23 to the shutter control unit 22, is stored in the storage unit above the opening 21a again and is charged by the shutter control unit 22. The front curtain 21b is still stored in the storage unit below the opening 21a. Accordingly, the shutter unit 20 is put into the monitor state in which light entering through the lens unit enters on the imaging sensor 40 (described later) in the imaging unit 30.

The heatsink 17 is arranged on a back surface of the imaging unit 30 and can absorb and radiate heat generated in the imaging unit 30.

The imaging unit 30 is arranged on a back surface of the shutter unit 20 and can convert light through the shutter unit 20 into an electrical signal and output the electrical signal. The imaging unit 30 also includes a dust removal filter that generates ultrasonic oscillation to remove foreign matters such as dusts adhered to the imaging unit 30. In this embodiment, an SSWF (Supersonic Wave Filter) is employed as an example of the dust removal filter. In the camera body 1 in this embodiment, in the state where the lens unit is not attached as shown in FIG. 1 and FIG. 2, the opening 4a of the lens mount 4 is opened, and therefore, foreign matters such as dusts can enter into the camera body 1. Moreover, since the shutter unit 20 is a normally-open type shutter as described above and the imaging unit 30 can be viewed from the side of the lens mount 4, the possibility that foreign matters are adhered to the imaging unit 30 becomes higher. When foreign matters are adhered to the imaging unit 30, there arises a problem that the foreign matters appear on an image. Thus, the single-lens reflex digital cameras and the single-lens digital cameras as in this embodiment have the SSWF, and drives the SSWF to shake off the foreign matters adhered to the imaging sensor 30.

Figure 4A:
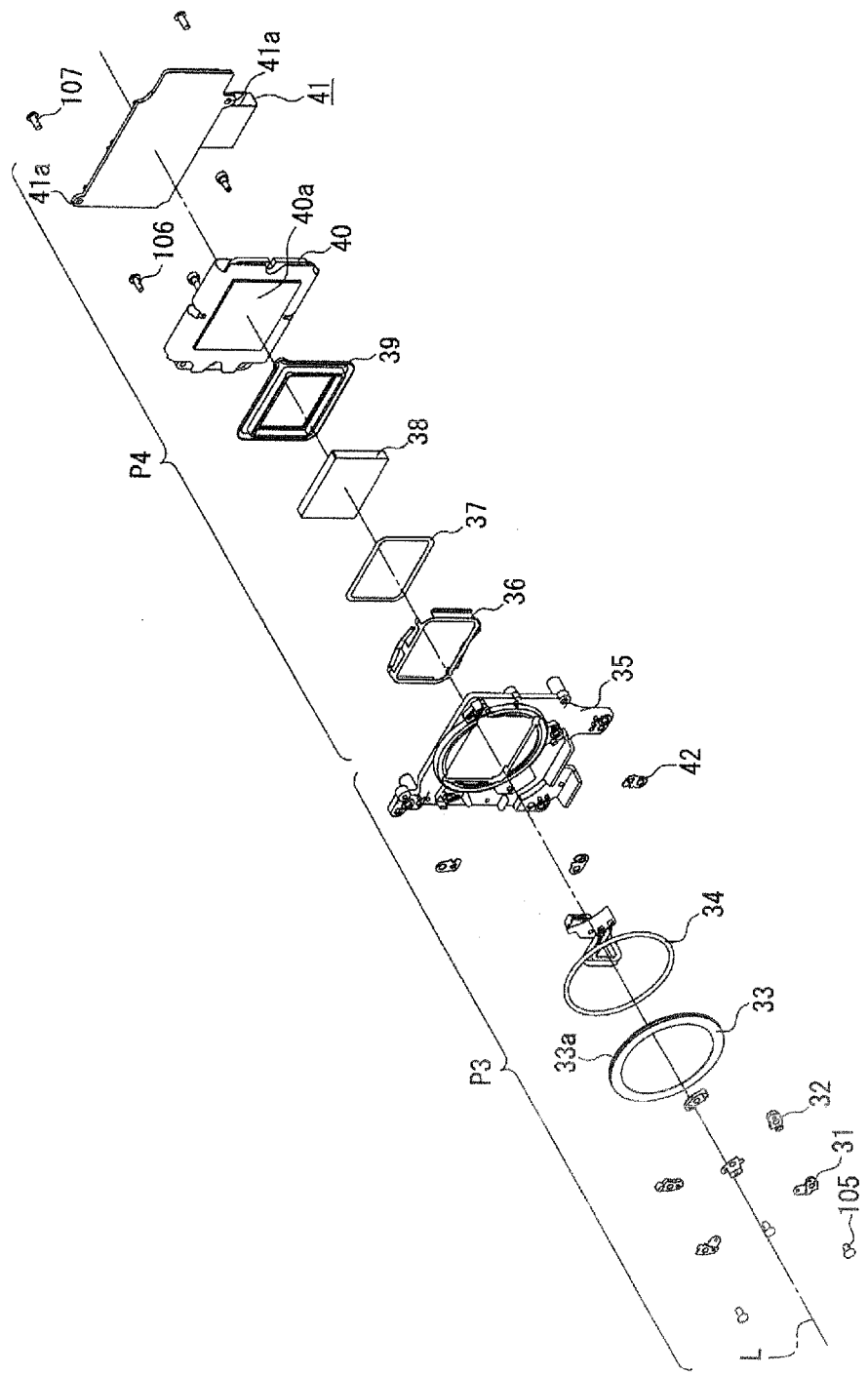
FIG. 4A is an exploded perspective view of the imaging unit.
Figure 4B:
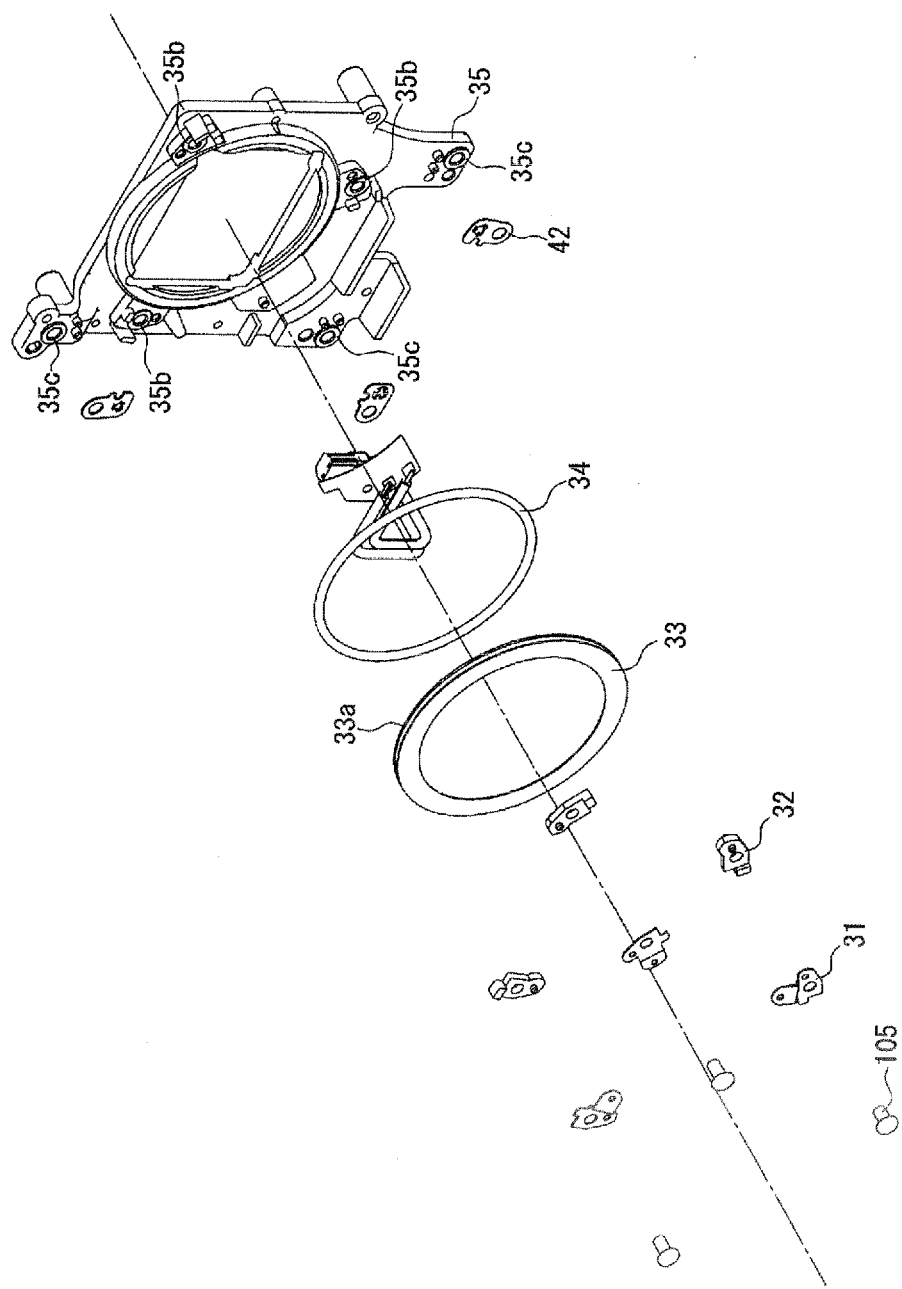
FIG. 4B is an enlarged perspective view of a part of exploded imaging unit.

FIG. 4A is an exploded perspective view showing the imaging unit 30. FIG. 4B is an enlarged perspective view of a parts group P3 in FIG. 4A. FIG. 4C is an enlarged perspective view of a parts group P4 in FIG. 4A. The parts group P3 is a parts group composing the SSWF. The parts group P4 is a parts group mainly including a low-pass filter (hereinafter referred to as LPF) and the imaging unit.

As shown in FIG. 4A, the imaging unit 30 has a plurality of members including an SSWF spring 31, an SSWF spring holder 32, a filter 33, an SSWF rubber 34, an SSWF base 35, an LPF spring 36, an LPF protect sheet 37, an LPF 38, an LPF packing 39, an imaging sensor 40, a substrate 41 that are arranged in this order in the direction of the optical axis L. The filter 33 is a transparent disc-like member and has a piezoelectric element 33a in the vicinity of its edge. By application of a voltage, the piezoelectric element 33a can generate oscillation in the filter 33. The filter 33 is held on the SSWF base 35 along with the SSWF rubber 34. The filter 33 and the SSWF rubber 34 are held on the SSWF base 35 by the SSWF spring 31 and the SSWF spring holder 32 that are fixed to the SSWF base 35 with screws 105. As shown in FIG. 4B, the screws 105 are screwed into a plurality of (three in this embodiment) screw holes 35b formed around an opening 35a on the SSWF base 35.

As shown in FIG. 4A, the imaging sensor 40 is fixed to a back surface of the SSWF base 35 across the LPF spring 36, the LPF protect sheet 37, the LPF 38 and the LPF packing 39. Specifically, the imaging sensor 40 is fixed to the SSWF base 35 so that an imaging plane 40a is opposed to the LPF 38 across the LPF packing 39. A plurality of (three in this embodiment) screws 106 for fixing the imaging sensor 40 are inserted into a plurality of (three in this embodiment) holes 40b (refer to FIG. 4B) formed on the imaging sensor 40 and are screwed into screw holes (not shown) formed on the back surface of the SSWF base 35.

The substrate 41 is arranged on a back surface of the imaging sensor 40. Various electrical components electrically connected to the imaging sensor 40 is mounted on the substrate 41. A plurality of (two in this embodiment) holes 41a into which screws 107 can be inserted are formed on the substrate 41. The substrate 41 is fixed to the SSWF base 35 by inserting the plurality of (two in this embodiment) screws 107 into the holes 41a and further screwing the screws 107 into screw holes (not shown) formed on the back surface of the SSWF base 35.

In this manner, the imaging unit 30 is completed. Light incident on the imaging unit 30 passes through the filter 33 and the LPF 38 and reaches the imaging plane 40a of the imaging sensor 40. The imaging sensor 40 converts the incident light into an electrical signal and outputs the electrical signal.

Next, an assembly procedure of the imaging system thus configured will be described. In FIG. 3A and FIG. 3B, first, the contact pin unit 13 is fixed to the mount frame 14. Specifically, the screws 104 are inserted into the holes 13c and then, screwed into the screw holes 14g.

Next, the lens mount 4 is fixed to the front surface 14d of the mount frame 14 across the lens mount spring 12. Specifically, the screws 101 are inserted into the holes 4b and then, screwed into the screw holes 14b. At this time, the protrusion 15a of the lens lock pin 15 is inserted into the hole 4d formed on the lens mount 4. The lock pin spring 16 is arranged between the back surface of the protrusion 15a of the lens lock pin 15 and the lens mount spring 12 so that a displacing direction of the lens lock pin 15 is substantially the same as an extending/contracting direction of the lens mount spring 12.

Next, the mount frame 14 is fixed to the main frame 11. Specifically, the protrusion 14e to which the lens mount 4, etc. are fixed is inserted into the opening 11a of the main frame 11 and a contact surface 14h of the mount frame 14 is brought into contact with a back surface 11c of the main frame 11. Next, the screws 102 are inserted into the holes 11b and then, screwed into the screw holes 14c.

Next, in FIG. 3A and FIG. 3C, the shutter unit 20 is fixed to a back surface of the mount frame 14. Specifically, the opening 21a of the shutter unit 20 is substantially aligned to the opening 14a of the mount frame 14, thereby bringing the shutter unit 20 into contact with the back surface of the mount frame 14. Next, the screws 103 are inserted into the holes 20a formed on the shutter unit 20 and then, screwed into screw holes (not shown) formed on the back surface of the mount frame 14.

Next, the imaging unit 30 is fixed to the back surface of the shutter unit 20. Specifically, screws 108 are inserted into a plurality of (three in this embodiment) holes 35c formed on the imaging unit 30 and then, screwed into a plurality of (three in this embodiment) screw holes (not shown) formed on the mount frame 14. At this time, the imaging unit 30 is arranged at the position adjacent to the shutter control unit 22 in the shutter unit 20.

Next, the heatsink 17 is fixed to the back surface of the imaging unit 30 with a plurality of (four in this embodiment) screws.

In this manner, the imaging system is completed. The above-mentioned assembly procedure is merely an example and may be changed in order as necessary. For example, in this embodiment, although the parts group P1 is assembled and then, the parts group P2 is fixed to the mount frame 14, the parts group P1 may be fixed after the parts group P2 is fixed to the mount frame 14.

Figure 5:
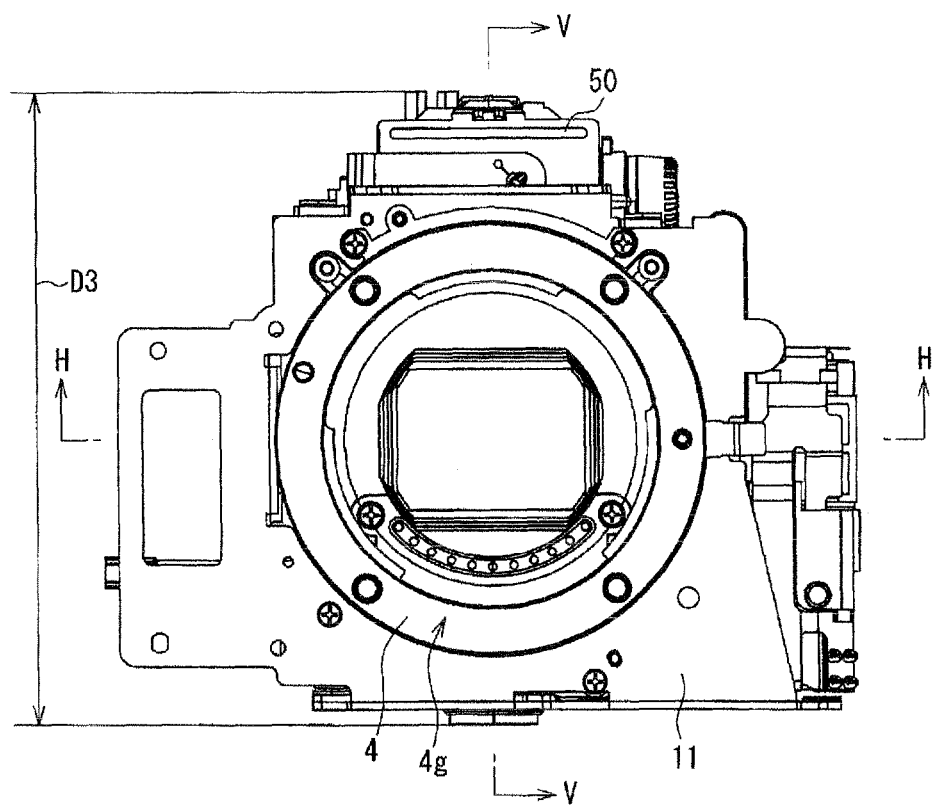
FIG. 5 is a front view of the imaging system.
Figure 6:
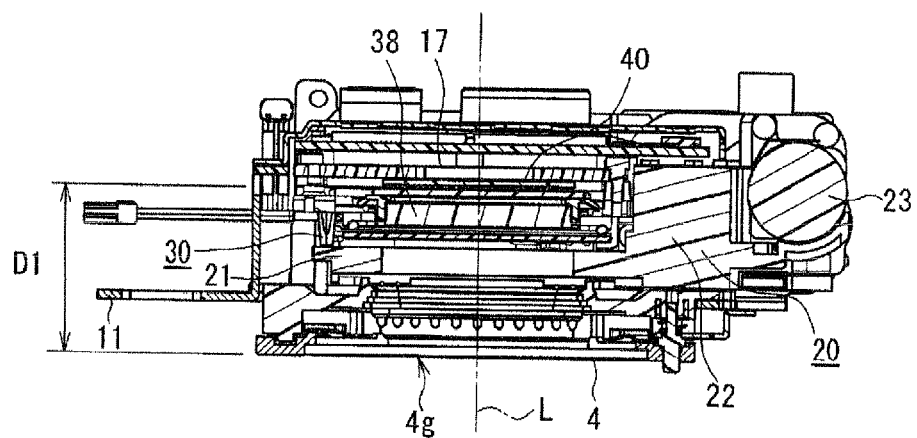
FIG. 6 is a sectional view taken along H-H in FIG. 5.
Figure 7:
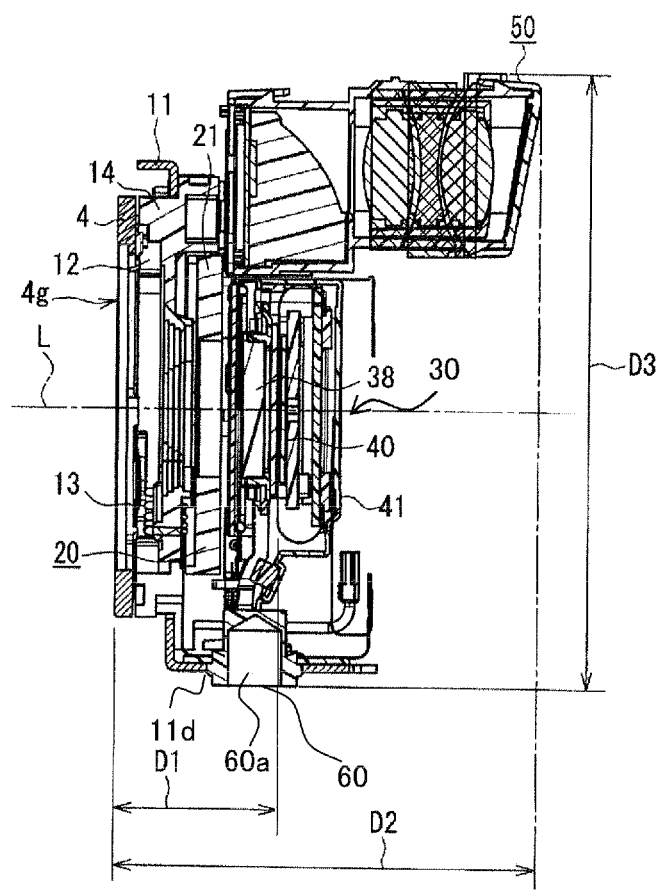
FIG. 7 is a sectional view taken along V-V in FIG. 5.
Figure 8:
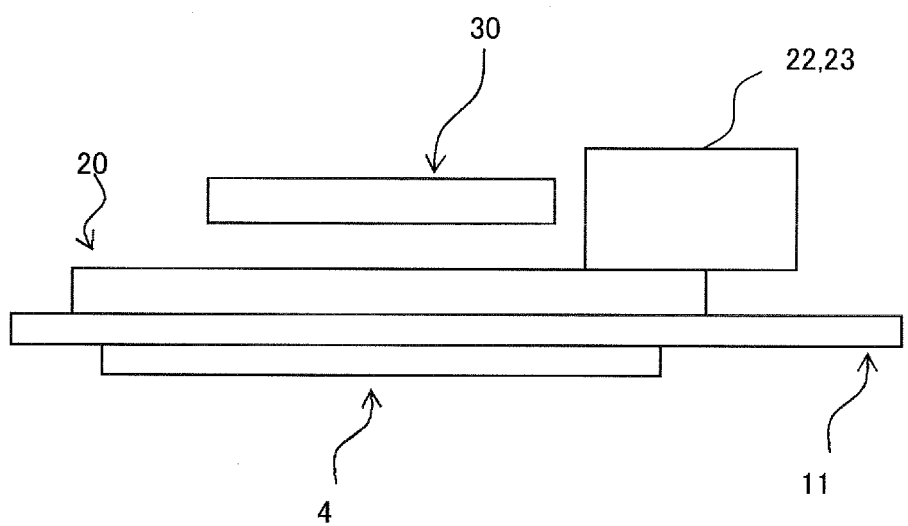
FIG. 8 is a simplified version of FIG. 6.

FIG. 5 is a front view of the imaging system when viewed from the side of the lens mount 4. FIG. 6 is a sectional view taken along H-H in FIG. 5. FIG. 7 is a sectional view taken along V-V in FIG. 5. FIG. 5 to FIG. 7 show the state where an electronic viewfinder (hereinafter referred to as EVF) unit 50 is added to the imaging system shown in FIG. 3A. D1 in FIG. 6 and FIG. 7 denotes a distance between a front surface 4g of the lens mount 4 and the imaging plane 40a of the imaging sensor 40 (refer to FIG. 6, for example). D2 in FIG. 7 denotes size between the front surface 4g of the lens mount 4 and an end of the EVF unit 50. In this embodiment, D2 is also a thickness of the imaging system. FIG. 8 and FIG. 9 are simplified versions of FIG. 6 and FIG. 7, respectively.

The EVF unit 50 has a display element such as a liquid crystal display of 1 to 2 inches therein. The liquid crystal display can display an image generated based on the electrical signal outputted from the imaging unit 30 and various information such as the number of photographs that can be recorded.

As shown in FIG. 6, in this embodiment, the mount unit composed of the lens mount 4, the lens mount spring 12 and so on is arranged on a front surface of the shutter mechanism 21 and as distinct from the conventional single-lens reflex digital cameras, no mirror box is provided. The shutter control unit 22 is arranged adjacent to the imaging sensor 40 in the direction of the imaging plane 40a. Further, the shutter control unit 22 is larger than the shutter mechanism 21 in thickness in the optical axis direction, and is arranged laterally adjacent to the shutter control unit 22 with the front surface thereof aligned with a front end of the shutter control unit 22. In other words, the imaging unit 30 is arranged within a peripheral portion defined by the thickness of the shutter control unit 22 in the optical axis direction. Therefore, as compared to the conventional configuration (the mirror box is provided between the shutter unit and the lens mount), the distance D1 between the front surface 4g of the lens mount 4 and the imaging plane 40a can be made smaller and as shown in FIG. 7, the thickness D2 of the imaging system can be also reduced.

As shown in FIG. 7, the EVF unit 50 is arranged above the imaging unit 30, with the front end of the EVF unit 50 being close to the mount frame 14. Since the imaging unit 30 is smaller than the lens mount 4 in height, a space above the imaging unit 30 is effectively utilized to arrange the EVF unit 50.

A screw hole 60a into which a screw of a camera-fixing tripod can be screwed is arranged behind the shutter mechanism 21 of the shutter unit 20 and below the imaging unit 30. The screw hole 60a is formed on a screw hole member 60 fixed to a circular hole 11d formed on a lower surface of the main frame 11 (refer to FIG. 3B). Since the imaging unit 30 is smaller than the lens mount 4 in height, a space below the imaging unit 30 is effectively utilized to arrange the screw hole member 60.

3. Effects of Embodiment and Others

In this embodiment, by omitting the mirror box that is necessary for the conventional single-lens digital cameras, the distance D1 between the front surface 4g of the lens mount 4 and the imaging plane 40a of the imaging sensor 40 (refer to FIG. 6, for example) and the thickness D2 of the imaging system in the direction of the optical axis L (refer to FIG. 7) can be made smaller, thereby enabling miniaturizing of the imaging apparatus. Moreover, since the number of parts can be reduced, cost reduction can be achieved and assembly can be simplified.

In this embodiment, as shown in FIG. 6 and FIG. 8 (simplified version of FIG. 6), at least a part of the shutter control unit 22 of the shutter unit 20 is arranged at a position intersecting an end surface of the imaging unit 30 on the side of the lens mount 4 (in this embodiment, the surface of the filter 33 on the side of the lens mount 4). In other words, the imaging unit 30 is arranged within a peripheral portion defined by the thickness of the shutter control unit 22 in the optical axis direction. Thereby, the thickness of the imaging system in the optical axis direction can be reduced, leading to miniaturization of the imaging apparatus. Further, in this embodiment, the motor 23 feeding the driving force to the shutter control unit 22 is also arranged at a position intersecting the end surface of the imaging unit 30 on the side of the lens mount 4 (in this embodiment, the surface of the filter 33 on the side of the lens mount 4). Thereby, the thickness of the imaging system in the optical axis direction can be reduced. Since the imaging unit 30 in this embodiment includes the SSWF, the end surface of the imaging unit 30 on the side of the lens mount 4 is the surface of the filter 33 on the side of the lens mount 4. However, in the case of the imaging unit having no SSWF, an end surface protruding most toward the lens mount is the end surface on the side of the lens mount.

In this embodiment, as shown in FIG. 7 and FIG. 9 (simplified version of FIG. 7), by omitting the mirror box, structures for guiding light from the mirror box to the optical finder (a graticule, a prism, and so on.) can be omitted. Thereby, a height D3 of the imaging system (refer to FIG. 5, FIG. 7) can be reduced. That is, the imaging apparatus can be miniaturized. Moreover, since the graticule, the prism and the like become unnecessary, the number of parts can be reduced, thereby achieving cost reduction and simplifying assembly.

In this embodiment, the lens mount 4 and the main frame 11, to which the shutter unit 20 and the imaging unit 30 are attached, are provided. Thereby, the strength to support the lens, the shutter unit 20 and the like can be sufficiently ensured in the camera body 1.

In this embodiment, as shown in FIG. 7 and FIG. 9, the EVF unit 50 is arranged above the imaging unit 30. Thereby, space above the imaging unit 30 can be effectively utilized. For example, as compared to configuration in which the EVF unit 50 is arranged behind the imaging unit 30, fore-and-aft length of the camera body 1 can be reduced.

In this embodiment, the tripod fixing screw hole 60a is arranged below the imaging unit 30. Thereby, space below the imaging unit 30 can be effectively utilized. Further, the tripod fixing screw hole 60a is arranged behind the shutter unit 20. Thereby, the tripod fixing screw hole 60a can be arranged rearward as much as possible without being interrupted by the shutter unit 20 that is larger than the imaging unit 30 in vertical height. Thus, even when a large lens unit is attached to the camera body 1, interference between a rear end of the lens unit and a pan head of the tripod is hard to occur.

In this embodiment, although the shutter unit 20 is arranged in contact with the back surface of the mount frame 14, for example, the shutter unit 20 may be arranged opposed to the mount frame 14 across a spacer so as to form a cavity between the shutter unit 20 and the mount frame 14. Also in this case, the same effects as those in this embodiment can be obtained.

The imaging sensor 40 and the imaging unit 30 including the imaging sensor 40 in this embodiment are examples of the imaging unit according to the present invention. The mount unit including at least the lens mount 4, the main frame 11 and the mount frame 14 in this embodiment is an example of the mount unit according to the present invention. The shutter unit 20 in this embodiment is an example of the shutter unit according to the present invention. The shutter control unit 22 and/or the motor 23 in this embodiment is an example of the shutter control unit according to the present invention.

In this embodiment, although only the camera body 1 is illustrated and described and the camera body 1 is explained as an example of the imaging apparatus according to the present invention, the imaging apparatus according to the present invention may include both the lens unit and the camera body.

INDUSTRIAL APPLICABILITY

The imaging apparatus according to the present invention is useful for a single-lens camera without a mirror box mounted in a single-lens reflex camera.

DESCRIPTION OF REFERENCE NUMERALS

1 Camera body
4 Lens mount
11 Main frame
20 Shutter unit
21 Shutter mechanism
22 Shutter control unit
23 Motor
30 Imaging unit
50 Electronic viewfinder
60a Tripod fixing screw hole

The invention claimed is:

1. An imaging apparatus comprising:
a main frame that is made of metal and has a front surface, a back surface, and a lower surface which protrudes in an optical axis direction behind the back surface;
a lens mount to which an interchangeable lens can be mounted, the lens mount provided on the front surface of the main frame;
a shutter unit that is provided behind the back surface of the main frame, the shutter unit including a shutter mechanism and having a front surface and a back surface; and
an imaging unit that is provided on the back surface of the shutter unit, the imaging unit having a front surface and a back surface;
wherein the main frame is a basis of assembling the lens mount, the shutter unit, and the imaging unit;
wherein the shutter unit and the imaging unit are disposed above the lower surface of the main frame;
wherein the imaging apparatus does not include a mirror box.

2. The imaging apparatus according to claim 1, further comprising:
a circular hole formed on the lower surface of the main frame for receiving a screw of a tripod.

3. The imaging apparatus according to claim 1, wherein the shutter unit further includes a shutter control unit for driving the shutter mechanism, and the shutter control unit is arranged on a side of the imaging unit.

* * * * *